United States Patent [19]

Okamizu

[11] Patent Number: 4,877,066
[45] Date of Patent: Oct. 31, 1989

[54] APPARATUS FOR FILLING TRANSMISSION FLUID INTO TRANSMISSIONS

[75] Inventor: Shigeo Okamizu, Southgate, Mich.

[73] Assignee: Mazda Motor Manufacturing (USA) Corporation, Flat Rock, Mich.

[21] Appl. No.: 239,615

[22] Filed: Aug. 31, 1988

[51] Int. Cl.⁴ .................... B65B 57/00; G01N 21/26
[52] U.S. Cl. ....................... 141/96; 141/128; 141/198; 141/217; 73/294; 250/577
[58] Field of Search .................... 141/94–96, 141/83, 192, 198, 360–362, 1, 206, 217, 218, 219, 225, 128; 184/1.5; 250/577, 576; 73/294, 290 R, 293

[56] References Cited

U.S. PATENT DOCUMENTS

| | | | |
|---|---|---|---|
| 3,536,925 | 10/1970 | Schmidt | 141/198 X |
| 3,702,625 | 11/1972 | Schmidt | 141/1 |
| 3,908,721 | 9/1975 | McGahey et al. | 141/128 |
| 4,015,645 | 4/1977 | Chamberlin | 141/198 X |
| 4,156,149 | 5/1979 | Vaccari | 250/577 |
| 4,247,784 | 1/1981 | Henry | 250/577 |
| 4,437,497 | 3/1984 | Enander | 141/1 |
| 4,485,856 | 12/1984 | Dulian et al. | 141/198 |
| 4,522,237 | 6/1985 | Endo et al. | 141/95 |
| 4,570,822 | 2/1986 | Procacino | 141/192 X |

FOREIGN PATENT DOCUMENTS

| | | | |
|---|---|---|---|
| 2908905 | 9/1984 | Fed. Rep. of Germany | 73/293 |
| 0206054 | 1/1984 | German Democratic Rep. | 141/95 |
| 55-67620 | 5/1980 | Japan | |

*Primary Examiner*—Ernest G. Cusick
*Attorney, Agent, or Firm*—Wenderoth, Lind & Ponack

[57] ABSTRACT

A filling apparatus for filling liquid into a container to either of at least two levels has a liquid pouring gun unit for dispensing a liquid and a sensor thereon for sensing that the distance of a surface of the liquid from the end of the gun unit closest to the liquid is a predetermined distance and producing a signal when this distance is sensed. A liquid supply line is connected to the gun unit and has a valve therein and counter for determining the amount of liquid which is flowing in the liquid supply line. The sensor and the counter are connected to a controller, which in turn is connected to the valve. The controller can be set for actuation at either of at least two levels. The controller actuates the valve, when it is set for a first level, to close the valve in response to the signal from said sensor, and actuates the valve, when it is set for a second level, to close the valve only after the controller has determined that a predetermined amount of liquid has flowed through the liquid supply line after receipt of the signal from the sensor.

9 Claims, 4 Drawing Sheets

FIG. 4.
FIG. 9.
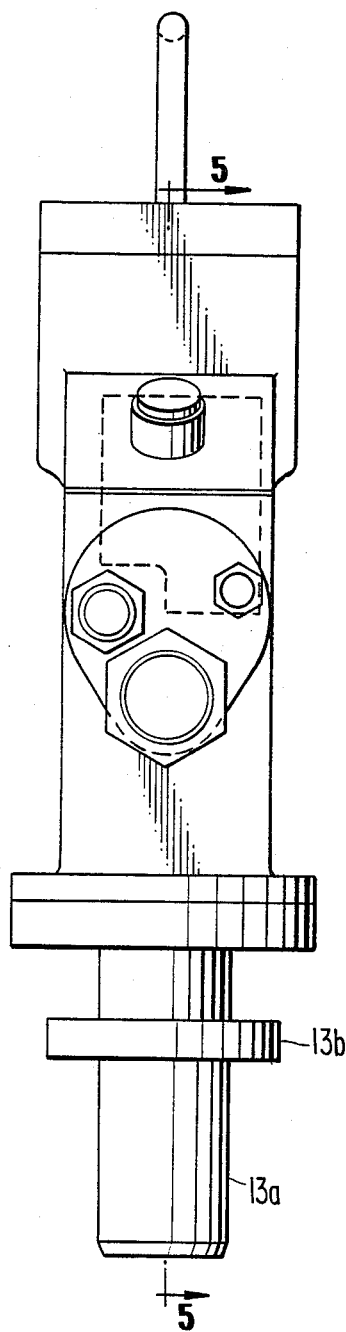
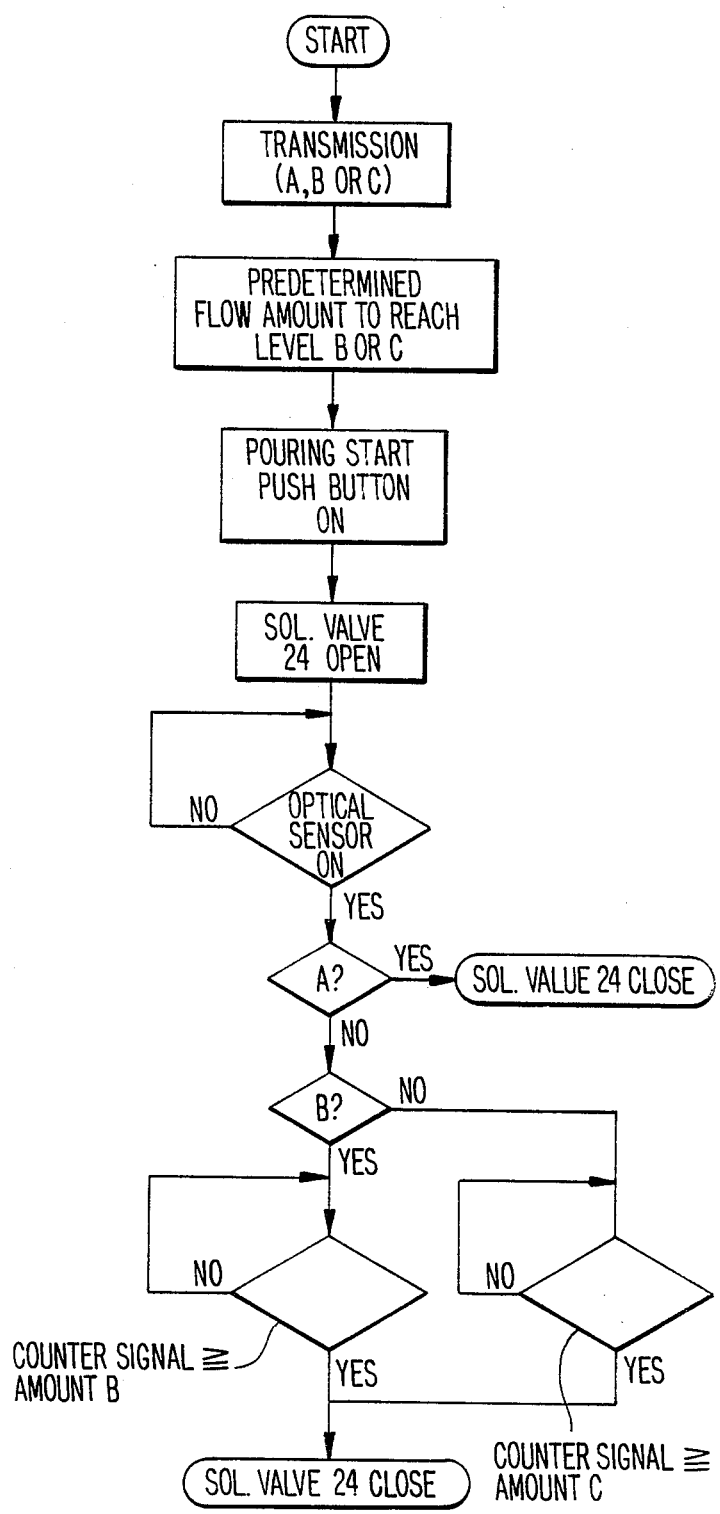

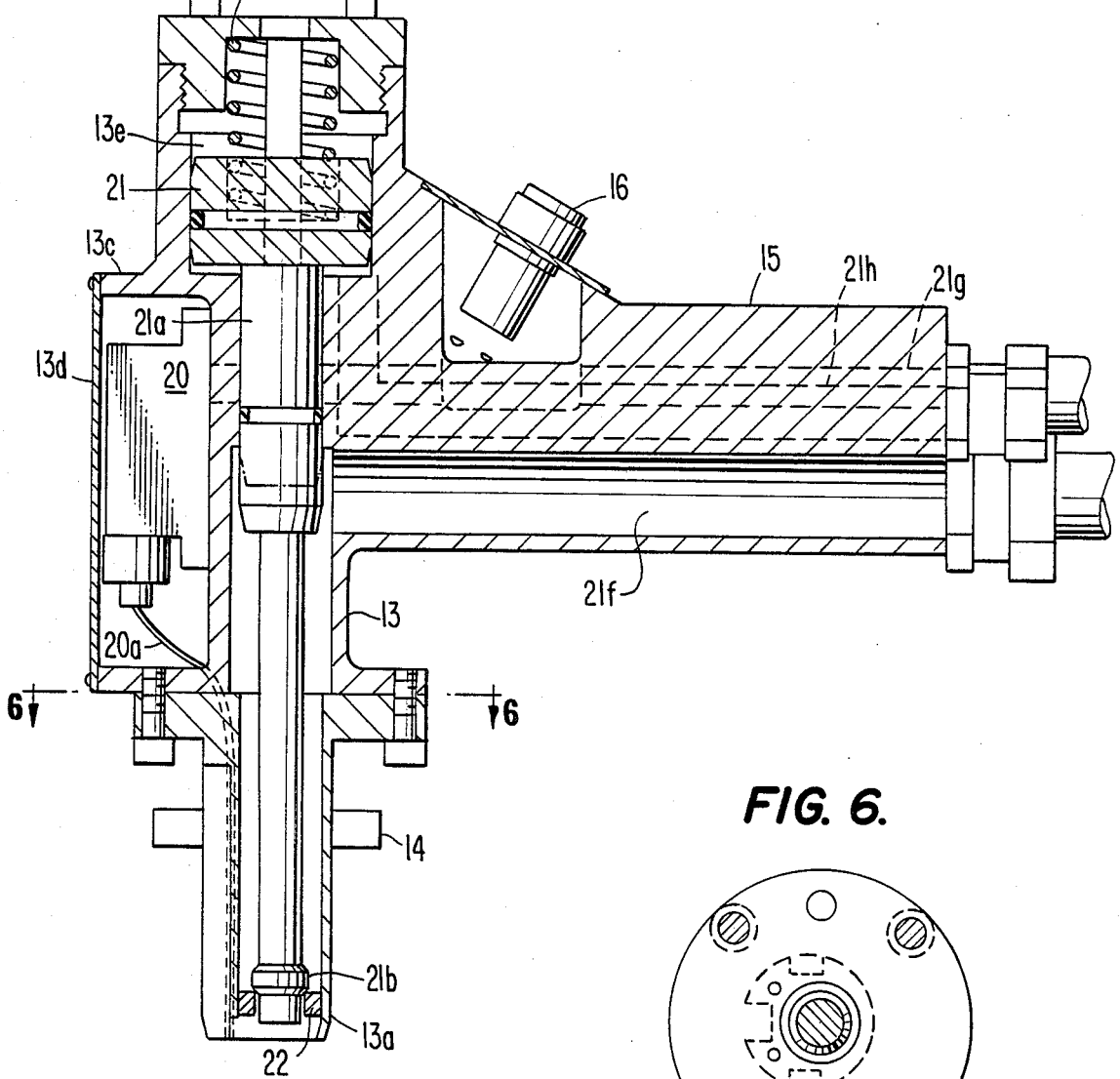
FIG. 5.
FIG. 6.
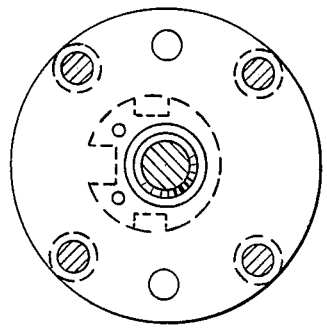

APPARATUS FOR FILLING TRANSMISSION FLUID INTO TRANSMISSIONS

The present invention relates to an apparatus for filling a fluid into an article, and more particularly to an apparatus for filling transmission fluid into transmissions of automotive engines.

BACKGROUND OF THE INVENTION

In the production of automobiles, it is the usual practice as the assembled engine and transmission is moved along a sub-assembly line, to fill the transmission with transmission fluid as the assembled motor and transmission moves past a transmission filling position along the subassembly line. This is normally done with a transmission fluid pouring gun unit which is manually operated by an operator, and the amount of fluid which is poured into the transmission by the use of the gun is judged by the eye of the operator. Where there are a variety of transmissions, the level to which the transmission fluid should be poured into the transmission can vary, depending upon the type of transmission, and it is rather difficult for the operator to properly manually judge the proper level of the transmission fluid in the transmission.

OBJECT OF THE INVENTION

It is the object of the present invention to provide an apparatus for filling liquid into a container for the liquid to either of at least two levels, which apparatus comprises a pouring gun unit having means for dispensing a liquid and having a sensor thereon for sensing that the distance of a surface of the liquid from the end of the dispensing means closest to the liquid is a predetermined distance, the sensor including means for producing a signal when this distance is sensed. The apparatus has a liquid supply line connected to the liquid pouring gun unit, and the liquid supply line has a valve means therein and a liquid flow amount determining means for determining the amount of liquid which is flowing in the liquid supply line. A controller is provided to which the sensor and the flow amount determining means is connected, and is in turn connected to the valve means, and it includes means for setting the controller for actuation at either of at least two levels, and further includes means for actuating the valve means, when the setting means is set for a first level, to close the valve means in response to the signal from the sensor, and for actuating the valve means, when the setting means is set for a second level, for closing the valve means only after the flow amount determining means has measured a predetermined amount of liquid after receipt of the signal from the sensor.

In particular, the filling apparatus is for filling transmission fluid into a transmission to either of two levels, and the sensor senses the level of the liquid in the transmission, and the controller actuates the valve means to close the valve means, when the setting means is set for a first level, when the liquid reaches the first level, and actuates the valve means, when the setting means is set for a second level, for closing the valve means only after the flow amount determining means has measured a predetermined amount of liquid after the receipt of the signal from the sensor, so that the liquid level in the transmission reaches the second level.

Other and further objects of the invention will become clear from the following specification, taken together with the accompanying drawings.

BRIEF DESCRIPTION OF THE DRAWINGS

In the drawings:

FIG. 4 is a rear elevation view, on an enlarged scale, of the pouring gun of FIGS. 2 and 3;

FIG. 5 is a sectional view taken along line 5—5 of FIG. 4;

FIG. 6 is a sectional view taken along line 6—6 of FIG. 5;

FIG. 9 is a flowchart showing the operation of the controller of FIG. 8.

DETAILED DESCRIPTION OF THE INVENTION

Figure 1:
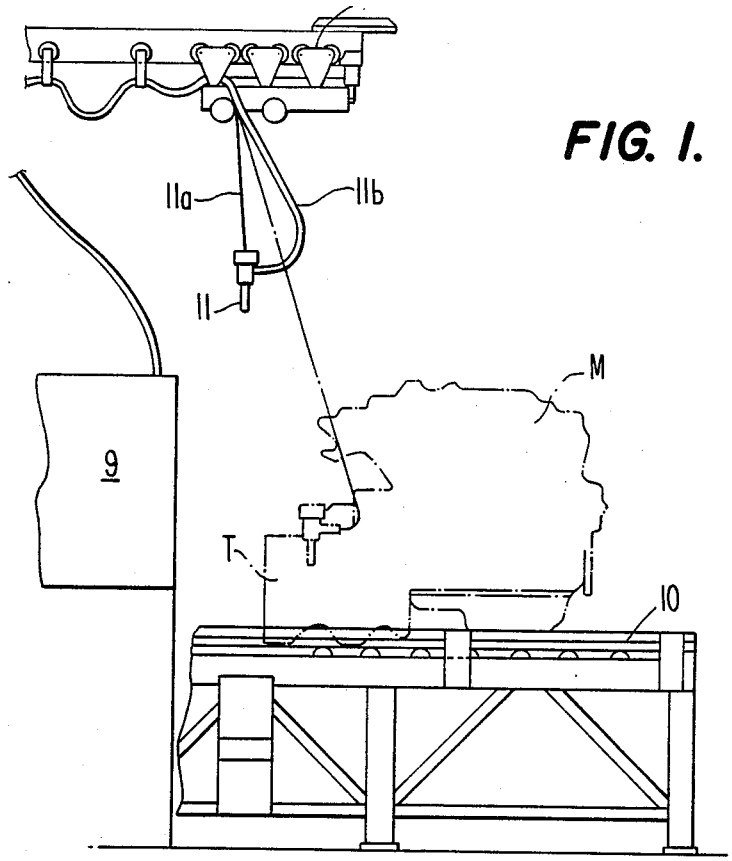
FIG. 1 is a schematic side elevation view of a subassembly line along which assembled engines and transmissions move, and showing the movement of an oil pouring gun into and out of position for filling transmission fluid into the transmission.
Figure 2:
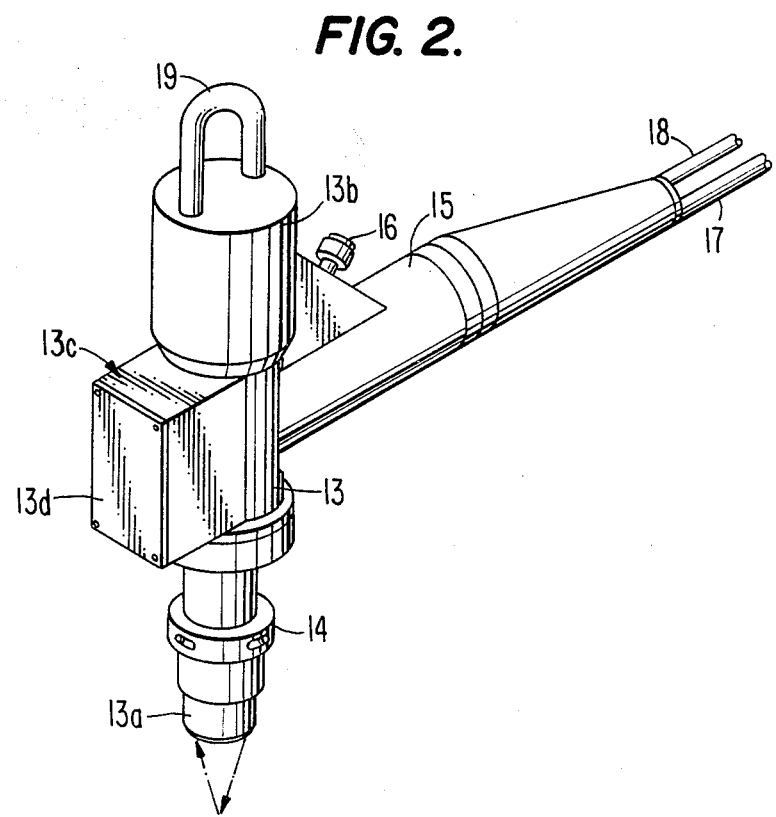
FIG. 2 is a perspective view of the oil pouring gun unit according to the invention.
Figure 3:
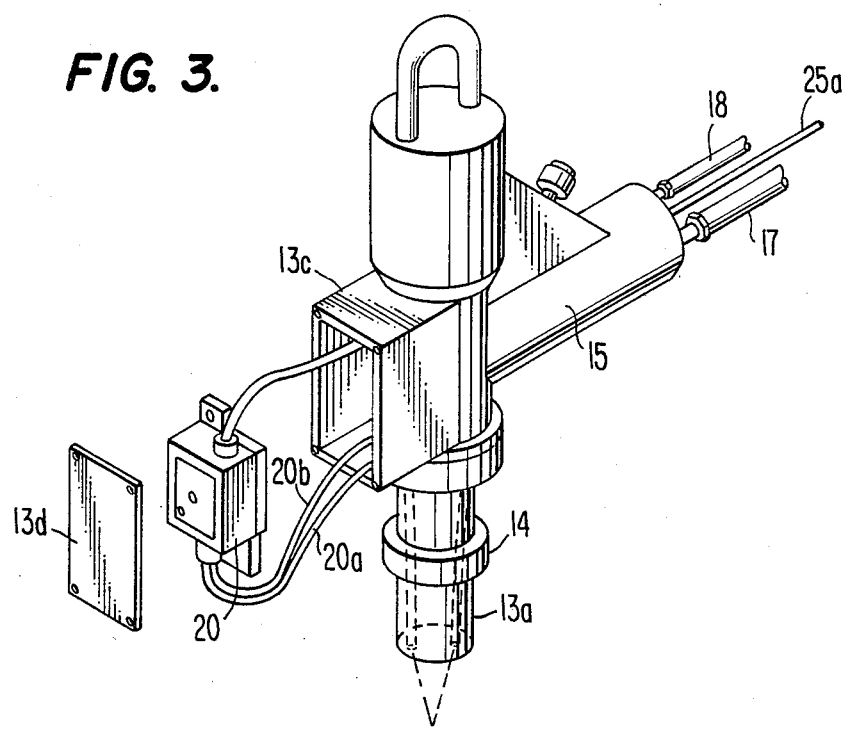
FIG. 3 is a view similar to FIG. 2, showing the gun partially disassembled.

Referring first to FIG. 1, there is shown a sub-assembly line for assemblies constituted by a motor M and a transmission T, shown in phantom lines. These subassemblies move along a roller conveyor 10 past a filling position where the transmission T is to be filled with a transmission fluid.

The transmission fluid is directed into the transmission by means of an oil pouring gun unit 11, which is suspended by a supporting line 11a from a supporting rail 12 having trolleys movable therealong, and which permits the gun to be moved from the full line elevated position as shown to the lower phantom line position where it is inserted into a filling opening in the transmission T. A supply line 11b, which is for supplying the liquid and also compressed air for gun unit operation, unit 11, to the gun extends over hangers to a control unit 9, which also exercises a certain control over the flow of the transmission fluid.

The oil pouring gun unit 11 is shown in greater detail in FIGS. 2—6, and is constituted by a main body 13 which has a generally hollow interior, and which has a pouring nozzle end 13a at the lower end and an upper end 13b on which is positioned a suspension hook 19 by which the gun unit is suspended on the supporting line 11a from the trolleys on the rail 12.

Incorporated in the main body 13 is an amplifier housing 13c, which is closed by a cover 13d, and which contains the sensor-amplifier structure to be described later.

Around the lower portion of the main body 13 is a stop ring 14 which is provided for engaging the gun unit with the transmission T. This positively positions the pouring nozzle end 13a relative to the transmission structure, so that the sensor, to be described later, can sense the level of the transmission fluid within the transmission.

Extending laterally from the main body 13 is a handle 15, to which is attached oil and air supply lines 17 and 18. On the handle is provided a manual pushbutton air valve control 16.

The sensor means is an optical sensor 20, which has optical fiber cables 20a and 20b extending therefrom along the main body to the pouring nozzle end 13a, at which point the ends of the cables are directed downwardly from the pouring nozzle end 13a, and at an angle to each other, so as to intersect at a point corresponding to the desired level of the liquid in the transmission. It includes a means for emitting light along one optical fiber cable, with the fiber cable being directed at an angle to the surface of the liquid, the level of which is to be sensed. The second optical cable which is for receiving reflected light is positioned so that it will receive light when the level of the liquid reaches a point such that the light from the light transmitting cable is reflected into the light receiving cable. The receipt of the light is detected by a conventional means for detecting the presence or absence of light, and a signal is emitted, which indicates that the desired level has been reached. The optical sensor 20 includes an amplifier means for amplifying the signal produced when the light emitted from one of the optical fiber cables is reflected from the surface of the liquid and directed into the other optical fiber cable. Such an optical sensor is disclosed in Published Japanese Application No. 55-67620 of May 21, 1980.

As seen in FIGS. 4—6, the structure of the gun unit includes the main body 13 to which the pouring nozzle end 13a is attached through bolts extending through flanges on the respective body parts. The upper end 13b is hollow, and contains a cylinder 13e within which is slidably positioned a piston 21, from which extends a shaft 21a having a valve member 21b on the lower end thereof adjacent the lower end of the pouring nozzle end 13a. A valve seat 22 is provided within the pouring nozzle end 13a against which the valve member 21b seats when the piston 21 is in the lower position.

The piston 21 is urged upwardly against the action of a spring 21c by pressurized air which flows through an air passage 21g to which the air supply line 18 is connected, and into the lower end of the cylinder 13e. The flow of air through this passage is controlled by a manually actuated valve (not shown) actuated by a pushbutton 16.

The handle further has a liquid passage 21f therethrough to which the liquid supply line 17 is connected, and which opens into the hollow interior of the main casing 13.

The handle further has an electric wire passage 21h therethrough through which the wire from the sensor-amplifier 20 extends out of the gun unit.

Figure 7:
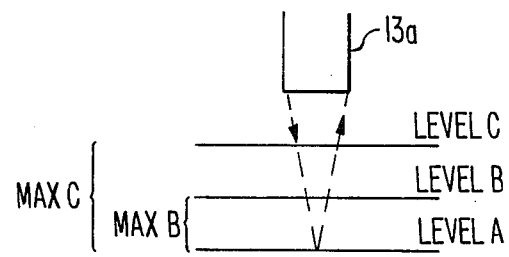
FIG. 7 is a diagram showing how the sensor of the present invention senses the level of a fluid.

Referring to FIG. 7, it will be understood that the sensor 20 directs light out of one of the optical fiber cable 20a, and this is reflected from the surface of the transmission fluid back into the optical fiber 20b when the level reaches the level A. The level A is the level of transmission fluid for a first type of transmission, and is the lowest level to which the transmission will be filled.

As pointed out above, a different type of transmission may require filling to a level B or even a level C, which are higher than the level A in the transmission.

It will be understood that the pouring gun unit with the sensor 20 can be easily operated to fill to the level A, with means for cutting off flow of the transmission fluid being actuated when the level A is sensed by the optical sensor.

However, it is inconvenient to provide an optical sensor which will sense a plurality of levels, since the sensor will become quite complex both physically and electronically, requiring additional optical fiber cables and additional complex electronics.

The present invention makes use of the simple optical sensor structure which senses only the level A of the fluid, and adds means for supplying further liquid to reach level B or level C.

Figure 8:
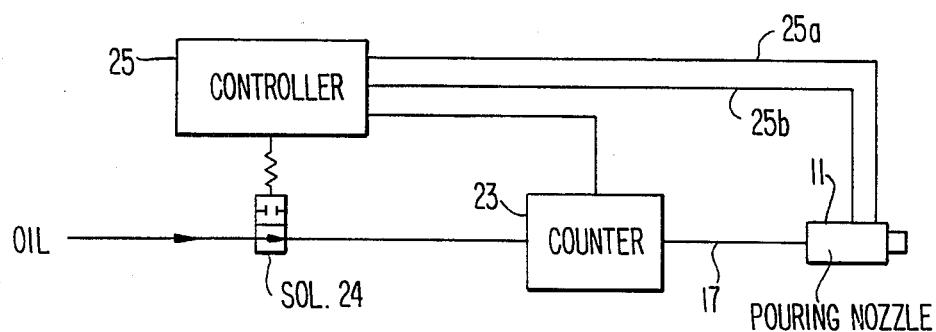
FIG. 8 is a schematic diagram of the apparatus according to the present invention.

Referring to FIG. 8, the apparatus of the invention further comprises a liquid controlling valve means 24 in the liquid supply line 17 for supplying liquid, such as transmission fluid, to the pouring gun unit 11 as described above. This liquid controlling valve means 24 can be a simple solenoid operated valve for opening and closing the liquid supply line 17 in response to signals.

In addition, there is also provided in connection with the supply line 17 a liquid flow amount determining means, here shown as a counter 23, for determining an amount of liquid which has flowed through the liquid supply line in a particular length of time.

Finally, there is provided a controller 25, to which the electric line 25a from the sensor-amplifier 20 and an electric line 25b from pushbutton 16 are connected, and to which the output of the counter 23 is connected, and which in turn is connected to the liquid controlling valve means 24. The controller includes means for setting the controller for actuation at either of at least two levels, for example at any one of the three levels A, B or C of FIG. 7. The controller is operable, when the setting means is set for the lowest level A, to close the liquid controlling valve means 24 in response to a signal from the sensor-amplifier 20. Thus, when the light from the sensor is reflected from the level A, it produces a signal, indicating that level A has been reached by the liquid being poured into the transmission, and this in turn is transmitted to the controller, and when the controller is set for level A, it is actuated to close the solenoid operated valve 24.

The controller further operates, when the setting means is set for a different level, for example level B, so that the controller is actuated to close the liquid controlling valve 24 only after the liquid flow amount determining means, such as the counter 23, has determined that a predetermined amount of liquid has flowed through the liquid supply line 17 after receipt of the signal from the sensor. This predetermined amount of liquid is the amount of liquid necessary to raise the level of the liquid in the transmission from the level A to the level B.

A similar operation of the controller causes the valve 24 to be actuated only after an amount of liquid has flowed which is sufficient to raise the level to the level C.

FIG. 9 is the flowchart for the operation of the controller to carry out the foregoing operation.

In the first step, the controller is set for the type of transmission which is to be filled, which determines whether the amount of transmission fluid is to be filled to the level A, the level B or the level C. In the second step, the predetermined flow amount to reach level B or level C from level A is chosen. Thereupon, upon actuation of the pushbutton 16 for opening of the unit valve member 21b, a signal is provided to the controller through line 25b, which causes the controller to open solenoid valve 24. Thereupon, when the optical sensor produces a signal, which is indicated by ON, which indicates that the level A has been reached, if the type of transmission has been set at A, the solenoid valve 24 is closed.

If transmission A has not been set, and instead transmission B has been set, then after the signal is received from the optical sensor, it is checked whether the signal from the counter has indicated that an amount of fluid sufficient to raise the level to the level B has flowed through the liquid supply line 17. When the controller indicates that this amount has flowed, then a signal is produced for closing the solenoid valve 24.

If level C has been set, then the control following the level B check causes a sensing of whether the counter signal has indicated that an amount of fluid C has flowed through the line 17, and when this signal is reached, then a signal is emitted to close the solenoid valve 24.

It will thus be seen that the invention provides a means for enabling an operator to simply insert the oil pouring gun unit 11 into the transmission T, and then actuate the pushbutton 16. The apparatus will then automatically fill the transmission to the preset level according to the type of transmission, and will then automatically shut off the flow of transmission fluid to the transmission, even if the pushbutton 16 remains actuated to hold the unit valve member 21b open. The operator need not exercise any judgement as to the level of transmission fluid. This not only speeds the operation, but ensures that the proper amount of transmission fluid is placed in each transmission.

It will be clear that the apparatus is not limited to use as a means for filling transmission fluid into transmissions. It can be used for automatically controlling the level of fluid filled into any container to any one of a plurality of levels.

What is claimed is:

1. A filling apparatus for filling liquid into a container for the liquid to either of at least two levels, comprising:
   a liquid pouring gun unit having means for dispensing a liquid and a sensor thereon for sensing that the distance of a surface of the liquid in said container from the end of the dispensing means closest to the liquid is a predetermined distance, said sensor including means for producing a signal when said distance is sensed;
   a liquid supply line connected to said liquid pouring gun unit, said liquid supply line having a liquid controlling valve means therein and liquid flow amount determining means for determining the amount of liquid which is flowing in said liquid supply line; and
   controller means to which said sensor and said liquid flow amount determining means are connected, and connected to said liquid controlling valve means, and including means for setting said controller means for actuation at either of at least two levels, and further including means for actuating said liquid controlling valve means, when said setting means is set for a first level, to close said liquid controlling valve means in response to the signal from said sensor, and for actuating said liquid controlling valve means, when said setting means is set for a second level, for closing said liquid controlling valve means only after said liquid flow amount determining means has determined that a predetermined amount of liquid has flowed through said liquid supply line after receipt of the signal from said sensor.

2. An apparatus as claimed in claim 1 in which said liquid pouring gun unit has manually actuated valve means therein for controlling the flow of liquid through said liquid pouring gun, said controller means being operable to actuate said liquid controlling valve means even when said manually actuated valve means is actuated to the open condition, for cutting off the flow of liquid to said liquid pouring gun.

3. An apparatus as claimed in claim 2 in which said pouring gun unit comprises a body having a pouring nozzle on one end thereof, a liquid passage extending through said body to said pouring nozzle, a valve seat upstream of said pouring nozzle, a valve member movable into and out of engagement with said valve seat, a valve shaft extending into said body from said unit valve member, said body having a cylinder therein and a piston in said cylinder to which said valve shaft is connected as a piston rod, and an air passage extending through said body to said cylinder and opening into said cylinder at an end thereof for, when pressurized air is admitted to said cylinder, urging said piston in a direction in said cylinder for causing said unit valve member to move away from said valve seat, spring means urging said piston in a direction for moving said unit valve member toward said valve seat, manually operated air valve means for controlling the admission of pressurized air through said air passage, and said sensor comprises an optical sensor means having optical fiber cables with the ends at said pouring nozzle for directing light out of one of said optical cables toward the surface of the liquid beneath said pouring gun unit and for receiving light reflected from the surface of the liquid, and sensor means in said body to which said optical cables are connected for processing the light signal received by said said optical cables and producing an output signal and amplifying it when a predetermined level of liquid below said pouring gun unit has been sensed.

4. An apparatus as claimed in claim 3 further comprising a stop on said body engagable with a container into which liquid from said apparatus is to be poured for positively locating said pouring gun unit with respect to the container.

5. An apparatus as claimed in claim 2 in which said manually actuated valve means comprises an air operated valve.

6. An apparatus as claimed in claim 2 further comprising a stop on said liquid pouring gun unit engagable with a container into which liquid is to be poured for positively locating said pouring gun unit with respect to the container.

7. An apparatus as claimed in claim 1 in which said liquid controlling valve means is a solenoid valve.

8. An apparatus as claimed in claim 1 in which said sensor is an optical sensor for sensing the position of the surface of the liquid by reflecting light from the surface.

9. An apparatus for filling transmission fluid into different types of transmissions to respective different levels ranging from a lowest level to at least one higher level, comprising:
   a liquid pouring gun unit having means for dispensing transmission fluid and having a sensor therein for sensing that the distance of the surface of the transmission fluid in the transmission being filled from the end of the dispensing means closest to the liquid is a predetermined distance, thereby indicating that the transmission fluid has reached a predetermined level in the transmission, said sensor including means for producing a signal when said distance is sensed;

a transmission fluid supply line connected to said liquid pouring gun unit, said supply line having a transmission fluid controlling valve means therein and a transmission fluid flow amount determining means for determining the amount of transmission fluid which is flowing in said supply line; and controller means to which said sensor and said transmission fluid flow amount determining means are connected, and which controller means for actuation at one of the respective levels to which a transmission is to be filled, and further including means for actuating said transmission fluid controlling valve means, when said setting means is set for the lowest level in a transmission, to close said transmission fluid controlling valve means in response to the signal from said sensor, and for actuating said transmission fluid controlling valve means, when said setting means is set for a higher level, for closing said fluid transmission controlling valve means only after said transmission liquid flow determining means has determined that an amount of transmission fluid has flowed sufficient to raise the level of fluid in the transmission being filled to the higher level after receipt of the signal from said sensor.

* * * * *